Aug. 21, 1923.

H. W. CRAIG 1,465,626

ILLUMINATOR FOR MAKING PHOTOGRAPHIC ENLARGMENTS

Filed Feb. 7, 1921

Inventor
Herbert W. Craig.
By Gabel & Mueller
Attys

Patented Aug. 21, 1923.

1,465,626

UNITED STATES PATENT OFFICE.

HERBERT W. CRAIG, OF CHICAGO, ILLINOIS, ASSIGNOR TO ADELE M. CRAIG, OF RIVERSIDE, ILLINOIS.

ILLUMINATOR FOR MAKING PHOTOGRAPHIC ENLARGEMENTS.

Application filed February 7, 1921. Serial No. 443,180.

*To all whom it may concern:*

Be it known that I, HERBERT W. CRAIG, a citizen of the United States, residing at Chicago, in the county of Cook and State of Illinois, have invented a certain new and useful Improvement in Illuminators for Making Photographic Enlargements, of which the following is a full, clear, concise, and exact description, reference being had to the accompanying drawings, forming a part of this specification.

My invention relates to illuminators for use in connection with cameras to make photographic enlargements of films or plates, one of the objects of my invention being the provision of a simplified device of this character which is effective in operation and cheap to manufacture. So far as I am aware the devices of this character at present upon the market are either complicated affairs or expensive devices, costing more than the average amateur wishes to pay.

My improved illuminator is one which is made up of some standard electrical fittings in addition to a simple and inexpensive framework so arranged that the negative which is to be enlarged, may be attached to the illuminator and then an ordinary camera used for making the enlargement.

For a better understanding of my invention reference is to be had to the accompanying drawing in which—

Figure 1:
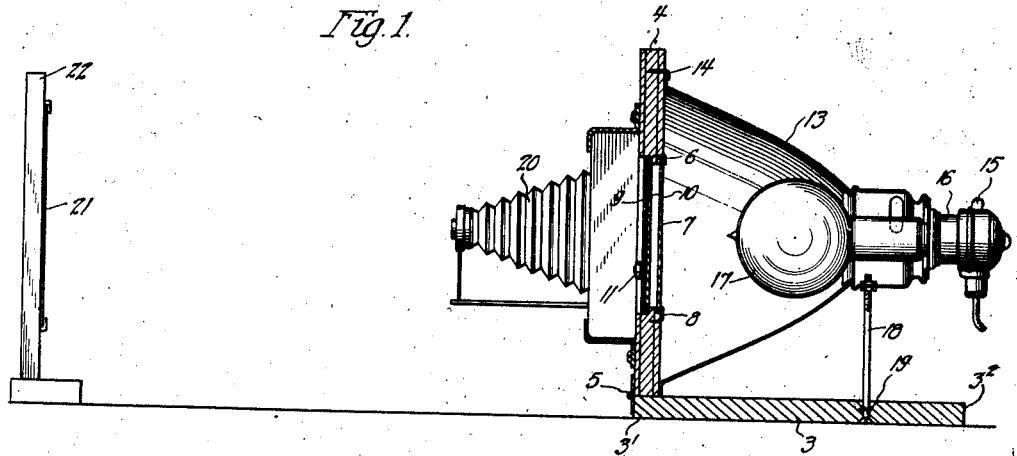
Fig. 1 is a side elevation partly in section showing the preferred form of my invention set up with a camera attached and pointed at the paper carrying easel or support.
Figure 2:
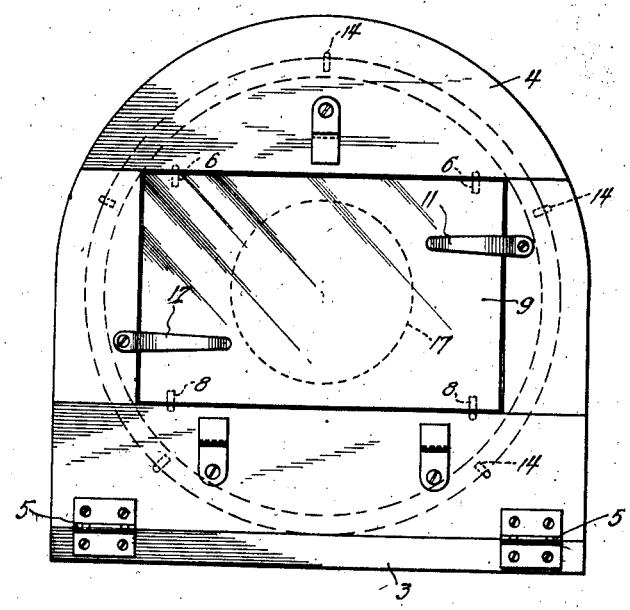
Fig. 2 is a face view of the illuminator with the camera removed.
Figure 3:
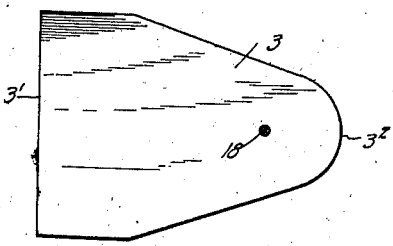
Fig. 3 is a small plan view of the base.

Referring now more in detail to the preferred form of my invention as shown, it comprises a base 3 preferably of wood, squared at the front end 3' and of V-shape conforming substantially to the outline of the reflector and rounded at the rear end 3² as shown in Fig. 3. This base supports an up-right 4 which is laminated as shown, being preferably made of wood and hinged to the base by means of ordinary hinges 5.

The up-right has an opening through the center of a size according to the size of the negative to be used with the illuminator, the one shown in the illustration being taken from a device adapted to take up to four by six negatives. At the back of the up-right 4 which is recessed so as to provide a shouldered edge 6 adapted to take a light diffusing glass 7 which is preferably a flashed opal glass although the ordinary ground glass may be used if desired. This glass is held in the recess in any suitable manner and I have provided small screw-hooks 8 which will removably hold the glass in place. The face of the up-right is also recessed to take the largest negative which the device is constructed for.

In the illustration I have shown a film held between plain glass plates 9 and 10 which are held in intimate contact with the film by means of the spring fingers 11—12. These fingers are secured to the up-right 4 so that they may be rotatably adjusted, being movable onto the plate or off when it is to be removed.

Supported at the rear of the up-right 4 is a suitable reflector 13 which is held lighttight against the back face of the up-right in a suitable manner preferably by means of angular screw-hooks 14 which may be turned down over the flange of the reflector or moved out of the way when the reflector is to be detached. For the reflector I have found a standard Hubbell type of reflector as illustrated to be very effective and being a standard product is easy to secure and comparatively cheap. This reflector carries a switch 15 at the rear end thereof and a socket at 16 adapted to take a lamp 17. I have found the ordinary stereopticon lamp to be very effective and if adjustment of the lamp is desired this may be brought about by the use of cheap standard commercial extension plugs which may be inserted into the socket 16 and then receive the base of the lamp. I also preferably support the reflector upon the base 3 independent of its support by the up-right 4 and to this end I simply drill a hole through the frame of the reflector so as to take a screw 18 carrying nuts for locking the reflector to the screw. This screw is inserted through the base 3 and has a couple of ears 19 struck out therefrom which lock in the wood base when the screw is rotated therein so as to rigidly hold it in place.

In order to secure an enlargement of the negative I preferably apply a suitable camera 20 to the face of the upright 4. The back cover of the camera is first removed so that the light from the lamp 17 will be projected through the negative against the lens of the camera which is adjusted so as to focus the enlargement upon the sensitized paper 21 attached to an easel 22. This paper 21 is adjusted at a distance from the camera according to the size of the enlargement. The focusing, of course, is done before the paper 21 is exposed, using the easel 22 for that purpose. The light 17 is then turned off, or the shutter closed, the sensitized paper 21 applied to the easel and then the shutter opened or the light again turned on. This enlarging is, of course, done in a dark room and in order to positively exclude the light the operator may place a light-proof cloth over the entire apparatus back of the lens so as to seal up all of the possible openings.

From the foregoing description it will be apparent that I have produced an inexpensive, simple but effective illuminator for use in making enlargements, and that it is thus particularly attractive to those desiring a device of this character, such as amateurs who make but comparatively few enlargements and therefore do not wish to make more than a moderate outlay for such a device.

I claim:

1. In an illuminator for making photographic enlargements, a base, a negative holding flat upright frame carried by the base, a lamp reflector attached light-tight directly against the rear face of the frame so as to project the light through a central negative holding opening in the frame, and means for attaching a camera directly against the front face of the frame so that the light projected through the negative when held in the opening will be projected through the camera lens.

2. In a device of the character described, a base, a flat upright hinged to the base, so as to be tiltable forwardly, a lamp reflector and socket secured to the base and having an open end of the reflector detachably secured light-tight against the rear face of the upright, means for attaching a light-diffusing element to the rear of an opening through the upright, means for attaching a negative to the front of upright before the opening, and means whereby a camera may be attached to the face of the upright before the negative.

3. As an article of manufacture, an illuminator for making photographic enlargements comprising a flat wooden base, a standard electric lamp socket fixedly secured to the base, an open end flanged reflector carried by said socket, a flat wooden negative holding upright frame having a central exposure opening therethrough and to the rear face of which the flanged open end of the reflector is directly but detachably secured so as to project all the light through the frame opening, means for securing the upright to the base so that it may be removed form the face of the reflector so as to secure access to the socket through the inside of the reflector, and means for attaching a camera directly against the front face of the upright.

In witness whereof I hereunto subscribe my name this 24th day of January A. D., 1921.

HERBERT W. CRAIG.